Patented Apr. 24, 1923.

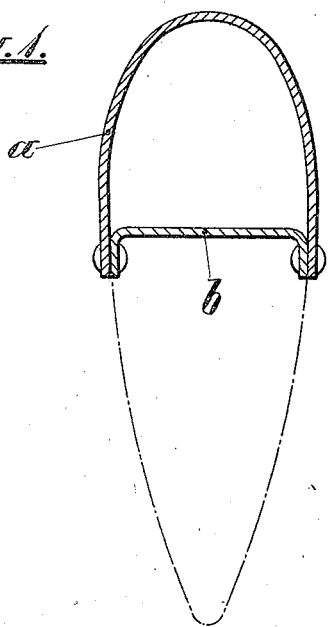
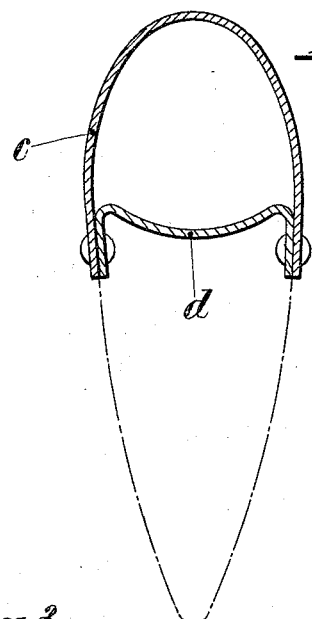
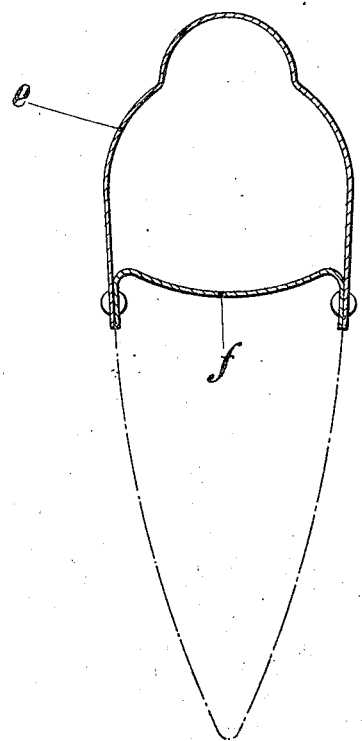

1,452,961

UNITED STATES PATENT OFFICE.

CLAUDIUS DORNIER, OF FRIEDRICHSHAFEN, NEAR BERLIN, GERMANY, ASSIGNOR OF ONE-HALF TO DORNIER-METALLBAUTEN, GESELLSCHAFT MIT BESCHRÄNKTER HAFTUNG, OF FRIEDRICHSHAFEN, GERMANY.

GUTTIFORM SECTION.

Application filed June 28, 1920. Serial No. 392,551.

(GRANTED UNDER THE PROVISIONS OF THE ACT OF MARCH 3, 1921, 41 STAT. L., 1313.)

*To all whom it may concern:*

Be it known that I, CLAUDIUS DORNIER, a citizen of the German Empire, residing at Friedrichshafen near Berlin, Germany, have invented certain new and useful Improvements in Guttiform Sections (for which I have filed application in Germany, August 31, 1916), of which the following is a specification.

My invention refers to hollow structural members especially suited for parts for aircraft construction on account of their small air resistance.

Hollow structural members turn out rather heavy, if made of one tube of equal thickness of the wall only. In some cases therefore steel tubes were provided with cuneiform battens of wood in order to complete the stream-line form. But such constructional parts composed as above, can only be manufactured with difficulty, more especially in consideration of the assemblage points.

These draw-backs are done away with according to my invention by means of a stream line rod with a peculiar front part and a special connection of the same with the rear part. Accordingly the object of the invention is attained by the employment of a load-carrying front part and a faired non-load-carrying back part joined thereto in the main only serving to guide the air, said front part being constructed as a hollow beam with rearwardly projecting flanges. The flanges, according to the invention, continue in the line of the outer surface of the profile section and in the first place serve for fastening the non-load-carrying part. In the drawing affixed to this specification and forming part thereof I have shown several types of a hollow rod according to my invention, Fig. 1 showing a channel *a* with a flanged rib *b* closing it, while Figs. 2 and 3 disclose similar parts *c*, *d*, and *e*, *f*, respectively, the ribs *d f* in Figs. 2 and 3 and the channel *e* in Fig. 3 comprising a longitudinal corrugation.

I prefer composing the front part of two separate channelled beams in such a manner that the higher channel encloses the lower channel. Then this double beam which for the rest may also be used independently, can be connected very easily not only with a non-load-carrying back serving to guide the air, but also at its ends with gusset plates or other girder ends. In order to increase the safety against buckling, the front side or the inner channel may be provided with a longitudinal corrugation. In this latter case the air-resistance is not increased in the least in spite of the new shape.

I prefer composing, the load-carrying part of two metal beams which are riveted, or welded or screwed together, but other materials and methods of connection may also be employed.

The supplementary rear portions serving to guide the air are indicated by dash lines, they can be made for instance of thin wooden veneers or of thin aluminium plate.

I claim:

1. A stream lined structural member comprising in combination a hollow load carrying front portion with rearwardly projecting flanges and a non-load carrying fairing portion secured to said flanges.

2. A stream lined structural member comprising in combination an arched sheet metal channel rod, a shallow sheet metal channel inserted in said rod and fixed to the side walls thereof and a fairing back secured to said rod.

3. A stream lined structural member comprising in combination a hollow load carrying front portion with rearwardly projecting flanges a non-load carrying fairing portion secured to said flanges and a longitudinal corrugation in said front portion.

4. A stream lined structural member comprising in combination an arched sheet metal channel rod, a shallow sheet metal channel inserted in said rod and fixed to the side walls thereof, a fairing back secured to said rod and a longitudinal corrugation in one of said channels.

In testimony whereof I affix my signature.

CLAUDIUS DORNIER.